E. H. WILDASIN.
INDICATOR SYSTEM.
APPLICATION FILED SEPT. 30, 1916.

1,237,133.

Patented Aug. 14, 1917.
2 SHEETS—SHEET 1.

Witness
C. F. Rudolph

Inventor
Earl H. Wildasin,
By Victor J. Evans
Attorney

E. H. WILDASIN.
INDICATOR SYSTEM.
APPLICATION FILED SEPT. 30, 1916.

1,237,133.

Patented Aug. 14, 1917.
2 SHEETS—SHEET 2.

Witness
C. F. Rudolph

Inventor
Earl H. Wildasin,
By Victor J. Evans
Attorney

UNITED STATES PATENT OFFICE.

EARL H. WILDASIN, OF WILKINSBURG, PENNSYLVANIA.

INDICATOR SYSTEM.

1,237,133.   Specification of Letters Patent.   Patented Aug. 14, 1917.

Application filed September 30, 1916. Serial No. 123,124.

*To all whom it may concern:*

Be it known that I, EARL H. WILDASIN, a citizen of the United States, residing at Wilkinsburg, in the county of Allegheny and State of Pennsylvania, have invented new and useful Improvements in Indicator Systems, of which the following is a specification.

This invention relates to indicator systems, especially designed for use in connection with motor driven vehicles.

The object of the invention is to provide a system whereby the driver of the vehicle is notified when the supply of gasolene or other fluid is nearly exhausted.

Another object is to provide means whereby the driver is notified by means of visual and audible signals arranged in a convenient position.

With the above objects in view the invention consists of an automatically rotatable shaft rotated within the fuel tank, the said shaft operating an impulse wheel, pivoted arms operated by said impulse wheel and arranged to close the electrical circuits, magnets in said circuits, ratchets operated by the said magnets and visual and audible signals for indicating the state of the fuel supply.

In the drawings:—

Figure 1:
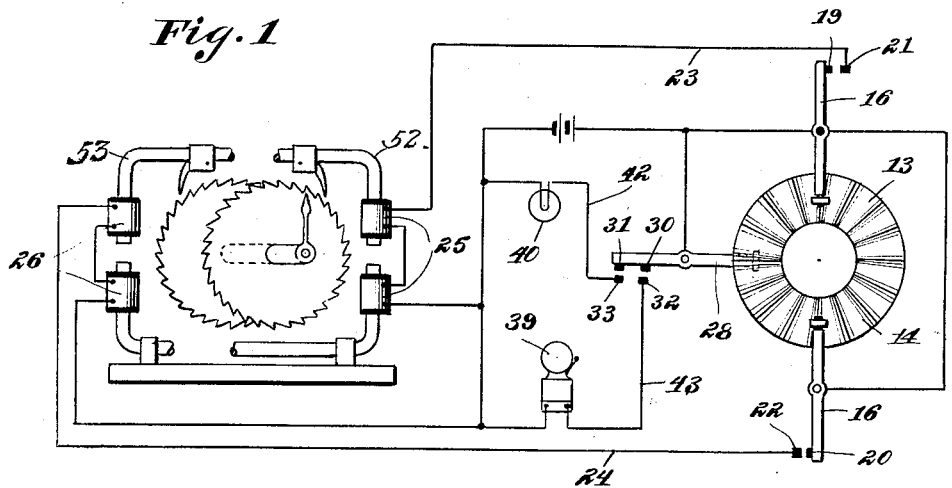
Figure 1 is a view of the invention illustrating the tank mechanism, the signal mechanism and the electrical circuits, all of the above parts being shown diagrammatically.
Figure 2:
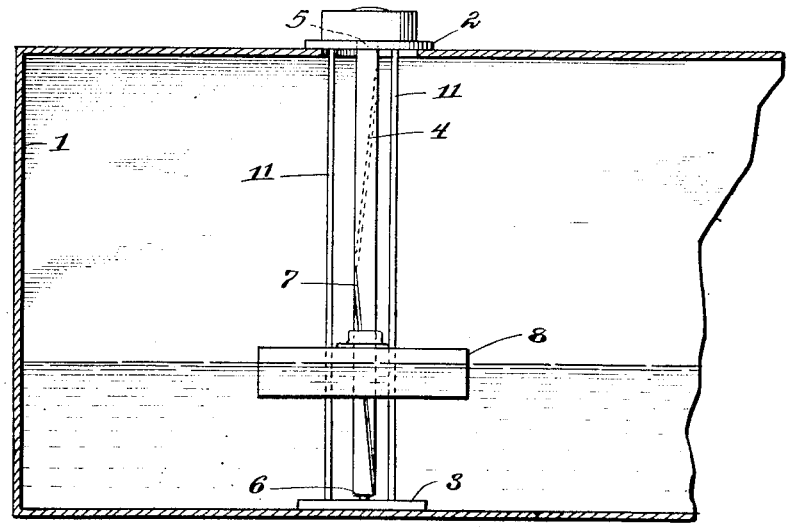
Fig. 2 is an elevation of the tank mechanism a part of the tank being shown in section.
Figure 3:
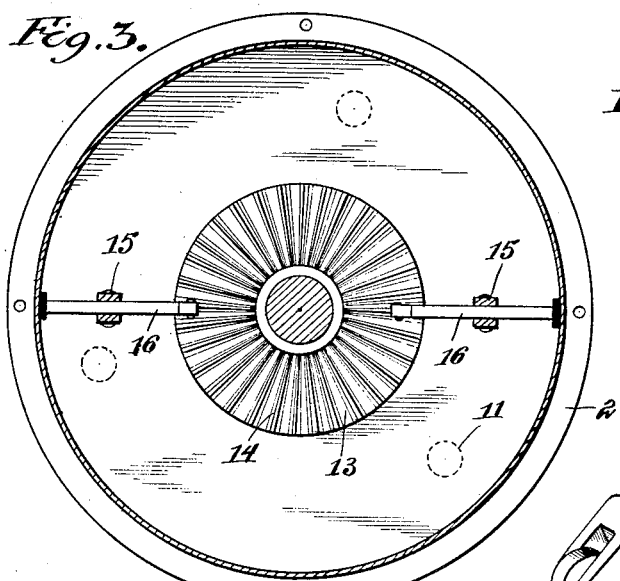
Fig. 3 is a horizontal sectional view through the tank mechanism taken on a line above the impulse wheel, and looking downward.
Figure 7:
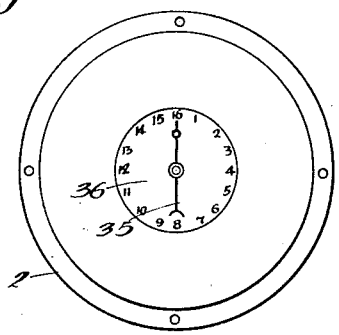
Fig. 7 is a detailed plan view of the indicator carried by the tank.
Figure 5:
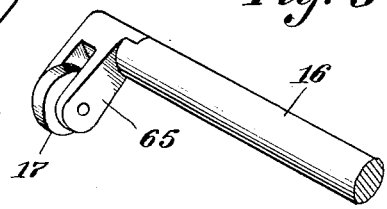
Fig. 5 is a perspective view of one of the contact arms.
Figure 4:
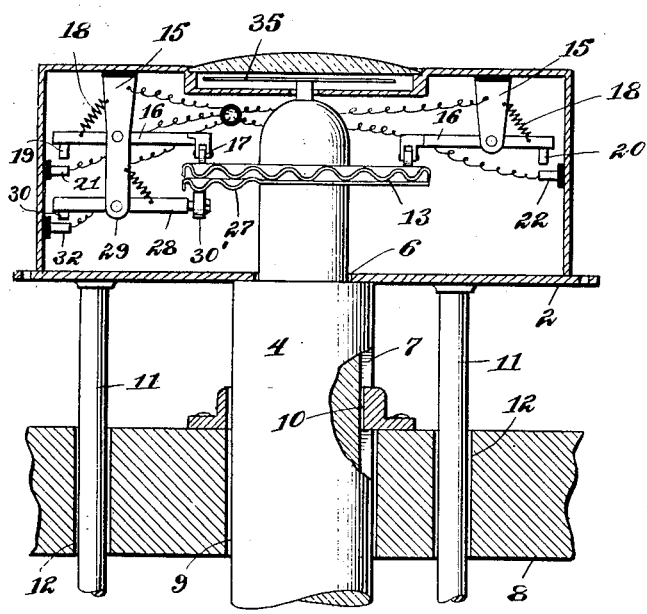
Fig. 4 is a vertical sectional view through the tank mechanism illustrating the position of the pivoted contact arms.
Figure 6:
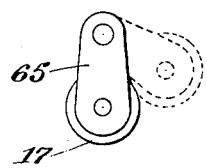
Fig. 6 is a detailed view illustrating the position of the roller for the said contact arm, the position of this roller being shown in full and dotted lines.

Referring more specifically to the drawings a fuel tank is shown at 1. This tank may be mounted upon a convenient part of the vehicle, the position of the said tank in no way affecting the operation of the invention. For this reason the device is not illustrated in position upon the vehicle. Mounted within the tank 1 by means of plates 2 and 3 which are secured to the bottom and top respectively of the tank, is a shaft 4. The plates 2 and 3 may contain suitable bearings 5 and 6 of any character, so that the shaft will revolve freely therein. A spiral groove 7 is formed in the shaft 1, this groove preferably making only one revolution of the shaft from its bottom to its top. A float 8, having a central aperture 9 of a size to receive the shaft, is provided with a lug 10 adapted to travel in the spiral groove 7. Vertical rods 11, preferably three in number, are secured to the plates 2 and 3, and pass through apertures 12 formed in the plate 8. The float as illustrated, consists of a light disk of any material which will remain upon the top of the gasolene or other fluid contained within the tank 1.

Rigidly mounted upon the upper end of the shaft 4 is an impulse wheel 13, provided upon its upper surface with radial corrugations 14. Brackets 15 carrying pivoted arms 16 are secured to any convenient part of the tank, in order that rollers 17 carried by the arms 16 will be in the path of the impulse wheel 13. Springs 18 secured to the arms normally urge the roller 17 into contact with the said impulse wheel. There are preferably two of the arms just described adapted to coöperate with the wheel 13 and these arms being preferably located at diametrically opposite points. The outer ends of the arms 16 are provided with contact points 19 and 20, these contact points being adapted to engage stationary contact points 21 and 22. The contact points just described are provided with suitable wire connections 23 and 24 to magnets 25 and 26 for a purpose to be presently described.

Upon the under face of the impulse wheel 13 are radial corrugations 27 similar to the corrugations 14 there being however only a small number of these corrugations. An arm 28 pivoted to the bracket 29, has a roller 30′ for contact with the corrugations 27, this arm carrying upon its opposite end contacts 30 and 31 adapted to engage stationary contacts 32 and 33.

Also mounted upon the shaft 4 is an indicator arm 35 traveling around the face of an indicator dial 36. This dial is provided with graduations as shown to indicate the contents of the tank in pints, quarts or gallons as desired.

The particular purpose for which the circuit closer is intended, is to intermittently operate an indicator placed at a remote distance therefrom, for example upon the instrument board of a motor vehicle, one means for operating such an indicator being illustrated in Fig. 1, this figure also including the wiring by which the mechanism is operated.

The indicator operating mechanism includes right and left hand stirrups 52 and 53, which are operated by magnets electrically connected to the previously described contact points, the stirrups engaging oppositely rotating ratchet wheels when the magnets are energized by the circuit closer to move these ratchet wheels the space of one tooth, the particular ratchet wheel operated being governed by the circuit closer.

As the impulse wheel is revolved in a direction controlled by the liquid within the tank 1, the particular contact lever is operated to close the circuits depending upon the direction of rotation of the shaft. The rotation of this shaft will operate one of the levers 16 to close either the circuit 23 or 24, and accordingly operate one of the ratchet wheels to move the indicator hand either to the right or left of a dial, to indicate the quantity of the liquid within the tank. The rising or falling of the liquid will intermittently close either of the contacts, due to the formation of the impulse wheel, and will intermittently move the indicator hand one degree around the dial.

Suitable insulation is provided wherever necessary in order to prevent the ignition of the contents of the tank.

In the operation of the invention the float 8 is caused to raise or lower, due to the amount of fuel within the tank 1. It is prevented from rotating by means of the guide rods 11, and as it moves up or down, it causes the shaft 4 to rotate through the lug 10, traveling in the spiral groove 7. As this groove only makes one complete revolution of the shaft from end to end it will be apparent that the movement of the float along the shaft causes one complete revolution of the same. As the indicator arm 35 is rigidly mounted upon the shaft the dial 36 will show exactly the amount of fluid within the tank. As the shaft 4 is revolved by means of the float the impulse wheel is caused to rotate, and bring into action one of the rollers 17 depending upon the direction of rotation of the impulse wheel. This causes the arm 16 to be rocked upon its pivot and to close the circuit of either the magnet 25 or 26. In order to select a proper magnet, so that the indicator arm 47 be moved to indicate the rise or fall of the fluid, the rollers 17 are mounted in pivoted bearings 65 one of these bearings being rigid when the impulse wheel is rotated to the right and the other bearing being rigid when the impulse wheel is rotated to the left. For example when the arm carrying the contact 19 has its roller carrying bracket 65 in a rigid or operative position, so as to rock the said arm upon its pivot, the opposite arm carrying the contact 20 has its bearing 65 rocked upon its pivot so that the roller will be dragged over the corrugations 14 without rocking its arm.

The circuits 23 or 24 are closed by their respective contacts and an electrical impulse is supplied to the magnets 25 or 26, causing their respective dogs to engage either of the ratchet wheels 48 or 49 and accordingly move the indicator arm 47 to the right or left. A suitable buffer 66 is provided for the stirrups 52 and 53 when they are released through the deënergizing of their magnets.

While the invention is shown and described as applied to a liquid containing tank, and the shaft is operated by the fluid therein, it is of course obvious that other means may be employed for revolving the shaft, and the right is reserved to revolve the shaft by any means desired.

From the foregoing description when taken in connection with the accompanying drawings it will be apparent that the invention provides an effective means for notifying the operator of a vehicle of the amount of fuel within the tank. In addition to this it enables the operator to check up the fuel put into the tank, the amount being readily readable upon the dial 38.

Having described the invention what I claim is:—

1. A circuit closer comprising a vertically disposed rotatable shaft, means for rotating said shaft, a member having an irregular surface and mounted upon said shaft for horizontal movement, a pivoted contact lever mounted for vertical movement adjacent said member and means interposed between said member and said contact lever for causing an intermittent operation of the latter upon rotation of the shaft in one direction only.

2. A circuit closer comprising a shaft, means for rotating the same, a corrugated member mounted upon said shaft, a contact lever pivoted adjacent said member, an element pivotally mounted on said contact lever for movement transversely of the same, said element being located in the path of movement of said member and a stop carried by said pivotally mounted element for engagement with said lever to lock the element against movement in one direction.

3. A circuit closer comprising a shaft, means for rotating the same, a corrugated member mounted on said shaft, a contact lever pivoted adjacent said member, a gravity element pivoted to said lever for movement at right angles to said corrugated member, said element being located in the path of movement and a stop carried by said gravity element for engagement with said lever to lock the element against movement in one direction.

4. A circuit closer comprising a vertically disposed rotatable shaft, means for rotating said shaft, a member having an irregular surface and mounted upon said shaft for horizontal movement, a pivoted contact lever mounted for vertical movement adjacent said member and an element swinging in a vertical plane and interposed between said member and said contact lever for causing an intermittent operation of the latter upon rotation of the shaft in one direction only.

5. A circuit closer comprising a vertically disposed rotatable shaft, means for rotating said shaft, a member having an irregular surface and mounted upon said shaft for horizontal movement, a pivoted contact lever mounted for vertical movement adjacent said member and an element swinging in a vertical plane and pivoted to said contact lever and engageable with said member for causing an intermittent operation of the contact lever upon rotation of the shaft in one direction only.

6. A circuit closer comprising a vertically disposed rotatable shaft, means for rotating said shaft, a member having an irregular surface and mounted upon said shaft for horizontal movement, a pivoted contact lever mounted for vertical movement adjacent said member and an element swinging in a vertical plane and pivoted to said contact lever and engageable with said member, whereby, said element will be moved in a direction away from said member during a rotation of the member in one direction and will engage said member to cause an intermittent operation of the contact lever during a rotation of the member in an opposite direction.

In testimony whereof I affix my signature.

EARL H. WILDASIN.